United States Patent
Doumen (10) Patent No.: US 9,973,927 B2
(45) Date of Patent: May 15, 2018

(54) ENABLING A SOFTWARE APPLICATION TO BE EXECUTED ON A MOBILE STATION

(75) Inventor: Jeroen Mathias Doumen, Hoofddorp (NL)

(73) Assignee: IRDETO B.V., Ls Hoofdorp (NL)

( * ) Notice: Subject to any disclaimer, the term of this patent is extended or adjusted under 35 U.S.C. 154(b) by 0 days. days.

(21) Appl. No.: 14/008,454

(22) PCT Filed: Mar. 21, 2012

(86) PCT No.: PCT/EP2012/055026
§ 371 (c)(1),
(2), (4) Date: May 28, 2014

(87) PCT Pub. No.: WO2012/130697
PCT Pub. Date: Oct. 4, 2012

(65) Prior Publication Data
US 2014/0295794 A1    Oct. 2, 2014

(30) Foreign Application Priority Data

Mar. 30, 2011 (EP) .................................... 11160423

(51) Int. Cl.
   *H04W 12/06*    (2009.01)
   *H04B 1/38*    (2015.01)
   *G06F 21/12*    (2013.01)
   *H04B 1/3816*    (2015.01)

(52) U.S. Cl.
CPC .......... *H04W 12/06* (2013.01); *G06F 21/123* (2013.01); *H04B 1/3816* (2013.01)

(58) Field of Classification Search
CPC ....... H04W 12/06; H04W 4/00; H04W 88/02; H04L 63/0853
See application file for complete search history.

(56) References Cited

U.S. PATENT DOCUMENTS

2015/0004940 A1*  1/2015  Zhang ................... H04W 12/06
                                                                          455/411

FOREIGN PATENT DOCUMENTS

| EP | 2 461 564 | 6/2012 | ............... H04N 5/00 |
| WO | WO 2005/084107 | 9/2005 | ............. G06F 21/00 |
| WO | WO 2005084107 | * 9/2005 | ............ H04W 12/06 |

OTHER PUBLICATIONS

An Efficient Authentication Protocol for GSM Networks, Min-Shiang Hwang Yuan-Liang Tang Cheng-Chi Lee, Department of Information Management, Chaoyang University of Technology, 168 Gifeng E. Rd., Wufeng, Taichung County, Taiwan 413, R.O.C.*
(Continued)

*Primary Examiner* — Inder Mehra
(74) *Attorney, Agent, or Firm* — Rimon PC; Marc Kaufman (57) ABSTRACT

The invention enables a software application to be executed on a mobile station in dependence of a SIM. Challenge data originating from the software application is input to the SIM to generate first response data using a security function of the SIM. The software application is enabled to be executed in dependence of the first response data. In addition, the challenge data may be transmitted to a verification server for the generation of second response data in dependence of the challenge data and possibly using an authentication center. The software application is then enabled to be executed in further dependence of the second response data.

9 Claims, 5 Drawing Sheets

(56) References Cited

OTHER PUBLICATIONS

PCT International Search Report and Written Opinion issued in corresponding PCT Patent Appln. No. PCT/EP2012/055026 dated May 4, 2012 (14 pgs).
European Search Report issued in corresponding European Appln. No. 11160423.7-1245 dated Sep. 22, 2011 (9 pgs).
Min-Shiang Hwang et al: "An Efficient Authentication Protocol for GSM Networks" May 17, 2000, 326-329 (4 pgs).

\* cited by examiner

ENABLING A SOFTWARE APPLICATION TO BE EXECUTED ON A MOBILE STATION

FIELD OF THE INVENTION

The present invention relates to protecting software applications. More specifically, the invention relates to enabling a software application to be executed on a mobile station.

BACKGROUND

Figure 1:
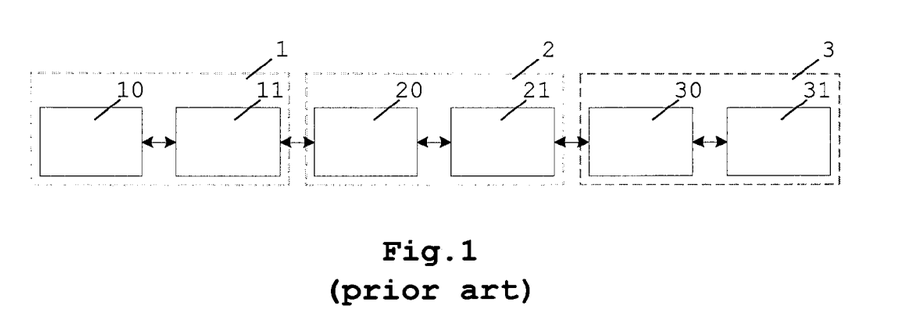
FIG. 1 is a schematic illustration of components in a prior art GSM mobile telecommunications network.

The GSM mobile telecommunication standard describes a network infrastructure that is adopted globally. It provides various security measures to protect the integrity of communicated data and makes sure that only authentic users can make calls and get charged only for calls that they initiated. The following abbreviations are adopted from the GSM specification ETSI TS 100 929 V8.0.0 (2000-10):
A3 authentication algorithm
A5 signalling data and user data encryption algorithm
A8 ciphering key generating algorithm
AuC Authentication Centre
BSS Base Station System
CKSN Ciphering Key Sequence Number
HLR Home Location Register
IMSI International Mobile Subscriber Identity
$K_c$ ciphering key
$\{M\}_{K_c}$ message M encrypted with ciphering key $K_c$
$K_i$ individual subscriber authentication key
LAI Location Area Identity
ME Mobile Equipment
MS Mobile Station
MSC Mobile services Switching Centre
R Random number (also referenced as RAND)
S Signed response (also referenced as SRES)
SIM Subscriber Identity Module
TMSI Temporary Mobile Subscriber Identity
VLR Visitor Location Register FIG. 1 shows the main system components involved in the security measures of a GSM network. A MS 1 contains a SIM 10 and a ME 11, which are communicatively connected. The SIM 10 is typically implemented on a detachably connectable SIM card. The SIM 10 is configured to perform an A8 and an A3 algorithm and stores the $K_i$ and IMSI data elements. The ME 11 is configured to perform an A5 algorithm and stores $K_c$, CKSN, LAI and TMSI data elements. A visitor network 2 contains a MSC/BSS 20 and a VLR 21, which are communicatively connected. The MSC/BSS 20 is configured to perform an A5 algorithm and stores $K_c$ and CKSN data elements. The VLR 21 stores IMSI, $K_c$, LAI, R, S, CKSN and TMSI data elements. A home network 3 contains a HLR 30 and an AuC 31, which are communicatively connected. The HLR 30 stores $K_c$, IMSI, R and S data elements. The AuC 31 is configured to perform an A3 and an A8 algorithm and stores IMSI and $K_i$ data elements. The ME 11 is communicatively connected to the MSC/BSS 20. The VLR 21 is communicatively connected to the HLR 30. If the MS 1 is located in its home network 3, then the home network 3 and visitor network 2 are one and the same.

The security data elements CKSN, IMSI, $K_c$, $K_i$, LAI, R, S and TMSI and the algorithms A3, A5 and A8 are used for protecting data communications and to authenticate a user to the network.

In general, the MS 1 is a consumer electronics device with a SIM 10. Typically the SIM 10 is embedded on a SIM card, but the SIM 10 may be integrated into the MS 1 otherwise.

An end user interacts with the MS 1 to make telephone calls and/or data communications in a mobile telecommunications network. Examples of MSs 1 are mobile phones, smartphones and tablet PCs. Other examples are energy metering devices and computing nodes in automotive devices.

Newer generations of MSs 1 leverage increased computing power to implement advanced mobile applications with sophisticated user interfaces.

The visitor network 2 is any network different from the home network 3 and is e.g. a network abroad. An important feature of the GSM standard is the ability for a consumer to use a MS 1 in any visitor network 2 if the home network 3 for that MS 1 has acquired a roaming agreement for cooperation with the visitor network 2. A MS 1 in a visitor network 2 typically operates as if it is located in the home network 3. Security protocols are available to support the concept of a visitor network 2 and facilitate the information exchange between the visitor network 2 and the home network 3.

The GSM mobile telecommunication standard is also known as the $2^{nd}$ generation mobile telecommunication standard or 2G in short. Later mobile telecommunication standards, such as e.g. UMTS/WCDMA, which is also known as the $3^{rd}$ generation mobile telecommunication standard or 3G in short, and LTE, which is also known as the $4^{th}$ generation mobile telecommunications standard or 4G in short, have adopted the GSM security protocol with some extensions. Alternative mobile telecommunication standards, such as e.g. CDMA and CDMA2000, use a security protocol similar to the GSM security protocol.

The extensions to the GSM security protocol as present in the later standards provide additional security capabilities.

Figure 2:
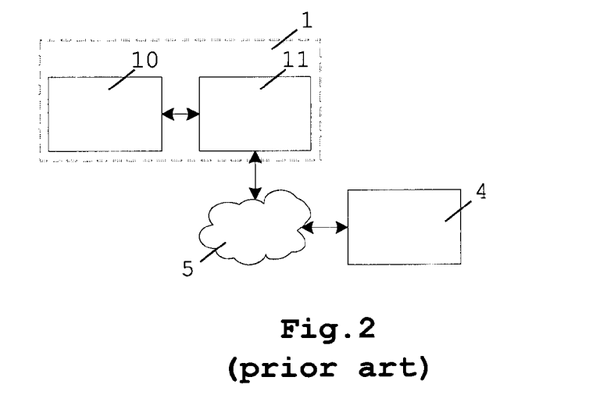
FIG. 2 is a schematic illustration of a MS connected to an application distribution server.

With reference to FIG. 2, MSs 1 such as smartphones and tablet PCs enable consumers to adapt the functionality of the MS 1 by installing an application (or app in short) from a so called application distribution server 4. Such application distribution servers 4 typically contain many installable applications for a particular brand and/or type of smartphone or tablet PC. The installation of an application generally is implemented using an internet connection between the MS 1 and the application distribution server 4. The internet connection can use any suitable data network 5, such as e.g. a mobile telecommunication network or WiFi network.

The application distribution server 4 enables a user to find and select an application for installation on the MS 1. The application distribution server 4 may charge a fee for the installation of the application onto the MS 1. An operator of the application distribution server 4 typically compensates a developer or any other rights holder of the application from the charged fee. To support this application distribution server business model, it should be hard for a consumer to obtain an installable application from a 'rogue' application distribution server that has no business relationship with the rights holder. Hereto the operating system (OS) of the MS contains application protection facilities that can secure the application. In order for an illegal distributor, hereinafter also referred to as attacker, to be able to redistribute the secured application, the protection measures of the OS need to be compromised. As these application protection facilities rely on privileges managed by the OS, an attacker will typically try to mount an attack to obtain the privilege level(s) for read/write access to all kernel files and storage locations. Having kernel level privileges also allows the attacker to modify other restrictions in the MS, such as e.g. a SIM operator lock. In practice, this so-called jail-break attack has been shown to be possible. A jail-broken MS allows the user to install applications from rogue application distribution servers.

Applications distributed by an application distribution server are dependent on the security features in the kernel of the OS and/or other applications in a MS that might be used for privilege escalation. Typically, if these security features are compromised, all applications in the application distribution server are compromised.

Applications from the application distribution server can be made resistant against a whitebox attack environment, wherein the application is executed in a non-secure environment and protected using software obfuscation techniques. The application is adapted to protect confidential information such as keys.

Software obfuscation is a known technology for implementing software programs such that they are hard to reverse engineer and resistant against a whitebox attack. This technology typically includes the replacing of software functions with a sequence of table lookup operations and merging the function lookup with transform functions that make it substantially infeasible to discover the function and the function parameters. The resulting secured software program performs input and/or output operations that consist of transformed parameters. These transformed parameters may require specific adaptations in modules interfacing with the secured software program.

Data and software obfuscation techniques make use of transformation functions to obfuscate intermediate results. The concept of transformation functions differs from encryption, which is clarified in general with reference to FIG. 3.

Figure 3:
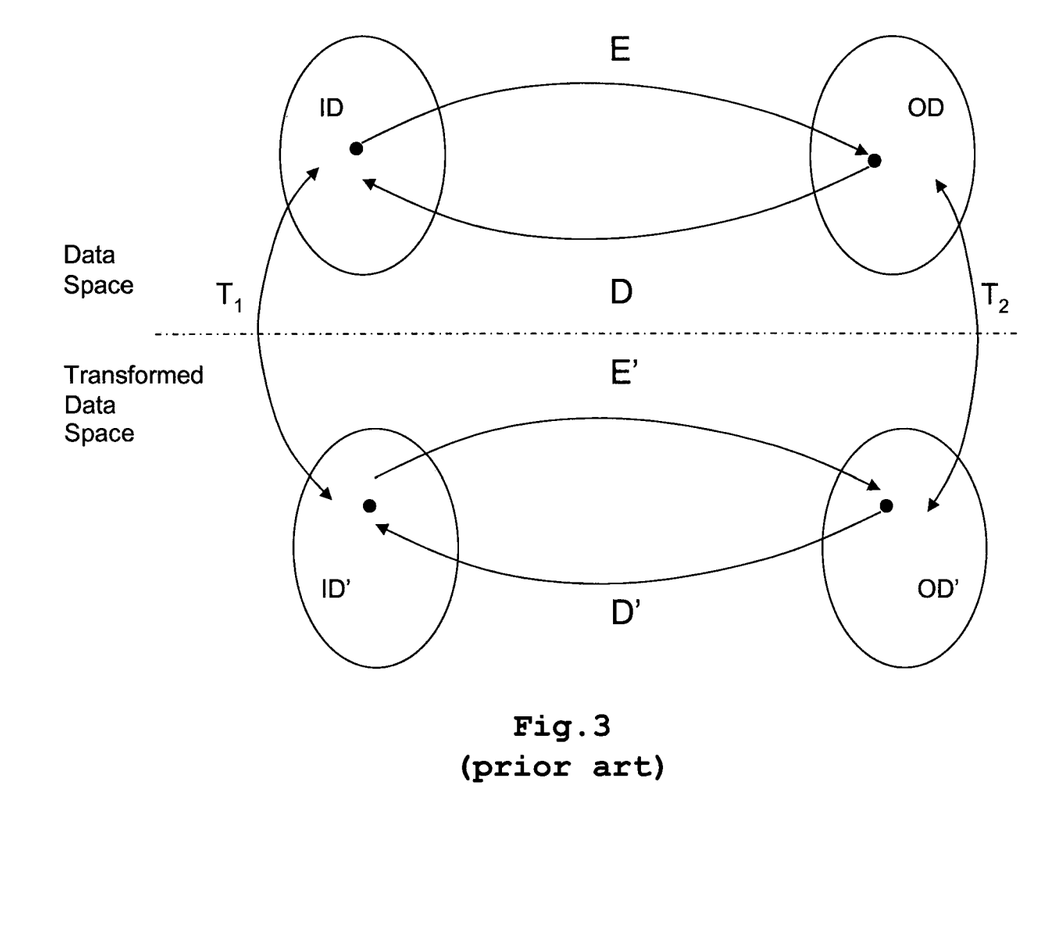
FIG. 3 is a diagram clarifying transformation functions and encryption in general terms.

Assume that there exists an input domain ID with a plurality of data elements in a non-transformed data space. An encryption function E using some key is defined that is configured to accept the data elements of input domain ID as an input to deliver a corresponding encrypted data element in an output domain OD. By applying a decryption function D using a key that corresponds to the key used by the encryption function E, the original data elements of input domain ID can be obtained by applying the decryption function D to the data elements of output domain OD. In a non-secure environment (typically referred to as "whitebox"), an adversary is assumed to know input and output data elements and have access to internals of encryption function E during execution. Unless extra precautions are taken in this environment, the key can be derived.

Additional security can be obtained in a non-secured environment by applying transformation functions to the input domain ID and output domain OD, i.e. the transformation functions are input- and output operations. Transformation function $T_1$ maps data elements from the input domain ID to transformed data elements of transformed input domain ID' of a transformed data space. Similarly, transformation function $T_2$ maps data elements from the output domain OD to the transformed output domain OD'. Transformed encryption and decryption functions E' and D' can now be defined between ID' and OD'. In case inverse transformations are to be performed, e.g. when results are to be communicated to the non-transformed space, $T_1$ and $T_2$ are injections.

Using transformation functions $T_1$, $T_2$, together with encryption techniques implies that, instead of inputting data elements of input domain ID to encryption function E to obtain encrypted data elements of output domain OD, transformed data elements of domain ID' are input to transformed encryption function E' by applying transformation function $T_1$. Transformed encryption function E' combines the inverse transformation function $T_1^{-1}$ and the transformation function $T_2$ in the encryption operation to protect the confidential information, such as the key. Then transformed encrypted data elements of domain OD' are obtained. Keys for encryption functions E or decryption function D cannot be retrieved when analyzing input data and output data in the transformed data space.

One of the transformation functions $T_1$, $T_2$ should be a non-trivial function. In case, $T_1$ is a trivial function, the input domains ID and ID' are typically the same domain. In case, $T_2$ is a trivial function, the output domains are typically the same domain.

In general, secured software applications use transformed intermediate results which are unusable when intercepted. This property enables the protection of confidential data in secured software applications.

There is a need for an improved technology for enabling the execution of a general purpose software application in a MS, while preventing the execution of the application or a binary copy of the application in another MS, without the above identified drawbacks of the prior art.

SUMMARY OF THE INVENTION

It is an object of the invention to provide for a technology enabling a software application to be executed in a MS, while preventing the execution of the application or a binary copy of the application in another MS.

According to an aspect of the invention a method is proposed for enabling a software application to be executed on a mobile station in dependence of a subscriber identity module. The method comprises inputting challenge data originating from the software application to the subscriber identity module. The method further comprises generating first response data in the subscriber identity module. The subscriber identity module is configured to perform a first security function, such as e.g. an A8+A3 function known from GSM or any equivalent security function known from other mobile communication technologies. The first response data is generated using the first security function with the challenge data as input to the first security function. The method further comprises enabling the software application to be executed in dependence of the first response data.

A software application is proposed which, when being executed by a processor, is adapted to input challenge data to a subscriber identity module, receive first response data from the subscriber identity module, and enable the software application to be executed in dependence of the first response data.

Thus, the software application is enabled to be executed in a mobile station that is provided with a specific SIM known to the software application. Effectively, herewith the execution of the software application is anchored to the SIM.

Advantageously the method enables the application to be enabled in a mobile station without a connection to a network, i.e. in offline mode.

The challenge data may be preconfigured in the software application, and the method may further comprise: verifying if the first response data corresponds with a preconfigured response data in the software application to obtain a verification result; and enabling the software application to be executed in further dependence of the verification result. This advantageously enables expected response data to be preconfigured in the software application, enabling the software application to verify the correctness of the first response data received from the SIM.

The first security function may comprise a first combined cipher key generation and authentication algorithm and the first response data may comprise at least one of a first cipher key and a first signed response. This advantageously enables the use of a GSM SIM or equivalent SIM of another mobile telecommunication technology to be used for enabling the software application to be executed.

The method may further comprise combining the first cipher Key and the first signed response using a first combining function (102) to obtain the first response data. This advantageously enables the combination of two responses from the SIM into a single response.

According to an aspect of the invention, there is provided a method for enabling a software application to be executed on a mobile station, wherein the software application comprises a first secured software part, a second secured software part and an inverse module, wherein the mobile station comprises a mobile equipment and a subscriber identity module, the method comprising, during execution of the software application on the mobile eguipment: the software application inputting challenge data originating from the software application to the subscriber identity module, wherein the challenge data comprises at least a part of runtime data of the software application at the end of the first secured software part when being executed in the mobile equipment;

generating first response data in the subscriber identity module, wherein said generating comprises the subscriber identity module performing a first security function using (a) data which is associated with the subscriber identity module and (b) the challenge data; enabling continued execution of the software application in dependence of the first response data; transmitting the challenge data from the mobile station to a verification server; generating second response data in the verification server in dependence of the challenge data; enabling the continued execution of the software application in further dependence of the second response data; inputting the challenge data to a cryptographic function of the verification server; obtaining intermediate data from the cryptographic function using the challenge data and a first key as input to the cryptographic function; transmitting the second response data from the verification server to the mobile station, wherein the second response data is based on the intermediate data; inputting the second response data or a derivation of the second response data to an inverse cryptographic function in the inverse module to thereby obtain an inverted response data using a second kev. wherein the inverted response data comprises the challenge data if the inverse function and the second key in the inverse module matches the cryptographic function and the first key in the verification server; and providing the inverted response data to the second secured software part to enable the continued execution of the software application. This method, and embodiments thereof, advantageously enable the SIM to be verified using a verification server remote to the mobile station. In this online mode the application can only be enabled in a mobile station having a connection to a network.

A method is proposed for generating a software application to be executed on a mobile station in dependence of a subscriber identity module. The method comprises obtaining challenge data and first response data in a server. The first response data originates from a security function, such as e.g. an A8+A3 function known from GSM or any equivalent security function known from other mobile communication technologies, using the challenge data and the first response data as input. The method further comprises embedding by the server the challenge data and the first response data in the software application to enable the software application, when being installed in the mobile station, to be executed by inputting the challenge data to the subscriber identity module to obtain second response data, verifying if the first response data corresponds with the second response data to obtain a verification result, and enabling the software application to be executed depending on the verification result.

A server is proposed for generating a software application to be executed on a mobile station in dependence of a subscriber identity module. The server is configured to obtain challenge data and first response data. The first response data originates from a security function, such as e.g. an A8+A3 function known from GSM or any equivalent security function known from other mobile communication technologies, using the challenge data as input. The server is further configured to embed the challenge data and the first response data in the software application to enable the software application, when installed in the mobile station, to be executed by inputting the challenge data to the subscriber identity module to obtain second response data, verifying if the first response data corresponds with the second response data to obtain a verification result, and enabling the software application to be further executed depending on the verification result.

Thus, a software application can be generated to be executed in a mobile station that is provided with a specific SIM known to the software application. Effectively, herewith the execution of the software application is anchored to the SIM.

The subscriber identity module may be configured to perform the security function, and the challenge data may be generated in a pre-install software application in the mobile station and input from the pre-install software application to the subscriber identity module for generating the first response data, and the server may be configured to obtain the challenge data and the first response data from the mobile station. This advantageously enables the challenge data and response data to be generated by a special purpose software application. The pre-install application can be a part of the personalized application, wherein the personalization step provides a set of challenge-response pairs for use by the already installed software application. Alternatively the pre-install application can be a stand-alone application or a part of another application such as e.g. application installation software.

An authentication center may be configured To perform the security function, with the server further configured to: generate the challenge data; receive subscriber identity data from the mobile station; transmit the subscriber identity data and the challenge data to the authentication center, wherein the security function corresponds to the subscriber identity data; and receive the first response data from the authentication server. This advantageously enables the challenge data and response data to be generated outside the mobile station.

The method may further comprises the step of combining the cipher key and the signed response using a combining function to obtain the first response data. This advantageously enables the combination of two responses from the authentication center into a single response.

The server may be an application distribution server, and the software application may be installable on the mobile station from the application distribution server. This advantageously enables the source of the software application to generate the challenge data and the response data.

The security function may comprise a combined cipher key6 generation and authentication algorithm, and the first response data may comprise at least one of a cipher key and a signed response. This advantageously enables the use of a GSM authentication center or equivalent authentication center of another mobile telecommunication technology to be used for the generation of the response data.

Hereinafter, embodiments of the invention will be described in further detail. It should be appreciated, however, that these embodiments may not be construed as limiting the scope of protection for the present invention.

The embodiments of claims 17 and 22 advantageously enable the challenge data and response data to be generated outside the mobile station.

The embodiment of claim 18 advantageously enables the combination of two responses from the authentication centre into a single response.

The embodiments of claims 19 and 24 advantageously enable the source of the software application to generate the challenge data and the response data.

The embodiment of claim 23 advantageously enables the use of a GSM authentication centre or equivalent authentication centre of another mobile telecommunication technology to be used for the generation of the response data.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

In all figures arrows indicate data flows.

DETAILED DESCRIPTION OF THE DRAWINGS

The invention enables a software application to be executed in a particular MS, while preventing the execution of the application or a binary copy of the application in another MS. During runtime of the application, challenge data originating from the application is input to a SIM of the MS and response data generated by the SIM in response to the challenge data is verified by the application and/or processed by a verification server which output is used by the application for further processing. The verification server is typically implemented in an application distribution server. The SIM processes the challenge data using an authentication algorithm and a ciphering key generation algorithm and returns response data.

The challenge data may be preconfigured in the application. Alternatively the challenge data comprise runtime data such as state information or parameter values of the application when being executed in the MS. If the MS is able to make a connection to the verification server from which the application originates, i.e. when the MS is online, the challenge data may be processed by the verification server in combination with an AuC to thereby generate the response data for the application.

Both secured and non-secured software applications can benefit from the invention, but for optimal results the software application is secured using e.g. software obfuscation techniques as non-secured software applications could be modified to ignore the challenge and response operation.

The invention uses the existing GSM security protocols or equivalent security protocols of other mobile communication standards to secure an application, as an alternative or additional and independent protection layer to the security features in the kernel of the OS. The invention makes the execution of the application dependent on secrets contained in the secured hardware environment of the SIM in the MS.

Figure 4:
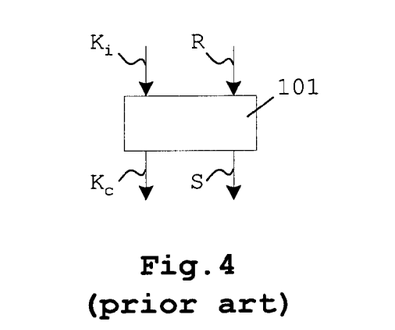
FIG. 4 is a schematic illustration of a prior art A8+A3 module.

FIG. 4 shows an A8+A3 module 101 as implemented in a SIM card conforming to the GSM standard. The A8+A3 module 101 is configured to perform a combined A8 and A3 algorithm using $K_i$ and R as inputs and giving communication key $K_c$ and signed response S as outputs. The ME 11 sends the input R to the SIM 10 and receives the resulting $K_c$ and S. The secret key $K_i$ is typically preconfigured in the SIM card. Input R can have any binary value.

Each SIM card is further preconfigured with a unique IMSI value to identify the SIM 10 to the network. In the network a similar A8+A3 module is available in the AuC 31 of the home network 3. On the basis of the IMSI value the GSM infrastructure is able to determine the correct home network 3 that has the ability to request its AuC 31 to calculate a $K_c$ using the random input R and its locally stored key $K_i$ as input to its A8+A3 module.

In normal GSM operation a random input R can be generated in the VLR 21 and then be used to send a request to the MS 1 to generate the signature S and the session key $K_c$. A similar request is sent to the home network 3 to verify that it knows the MS 1 as identified by its IMSI. Knowledge of the IMSI and $K_i$, and possession of the A8+A3 module 101 together prove that the MS 1 is authentic.

The invention provides a new way to enable a software application to be executed on a MS 1 in dependence of a specific SIM 10 in the MS 1.

In a first scenario the software application is enabled to be executed in a MS without having a network connection, i.e. the MS is offline. Instead of relying on the application protection facilities provided by the OS of the MS 1, the invention verifies that it operates in a MS 1 that contains a particular SIM 10. It uses the unique operation that the SIM 10 provides with the A8+A3 module 101.

Figure 5:
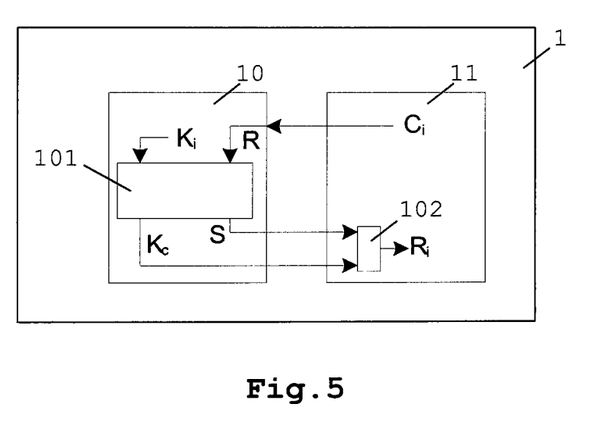
FIG. 5 is a schematic illustration of a mobile station according to an exemplary embodiment of the invention.

With reference to FIG. 5, the SIM 10 uses the A8+A3 module 101 and a secret key $K_i$ to prove its identity. The activation of the A8+A3 module 101 is performed by the ME 11 by sending a command containing a value R to the SIM card. The SIM 10 provides the signed response S and a session key $K_c$ as the result of execution of the A8+A3 module 101.

The combination of $K_c$ and S by a function f 102 can be regarded as a unique response $R_i=f(K_c,S)$ of the SIM 10 to a challenge $C_i$. Herein the function f 102 can be any mathematical function.

Figure 6:
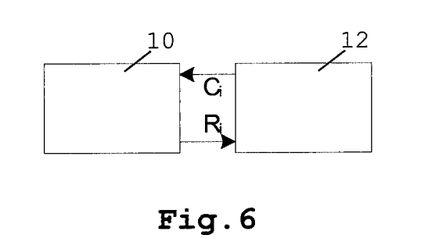
FIG. 6 is a schematic illustrations of a software application and a SIM in offline mode according to an exemplary embodiment of the invention.

With reference to FIG. 6, an application 12 installed in the MS 1 is secured and personalised. During execution the application 12 tests if a particular SIM 10 is present in the MS 1 in order to continue its intended operation. The application 12 achieves this by sending a challenge $C_i$ to the SIM 10 and verifying that the SIM 10 returns the expected response $R_i$ to the challenge $C_i$. The secured application 12 may perform this test in an obscured way, e.g. by delaying the comparison and/or by a sequence of partial comparisons.

The generation of a secured and personalised application 12 for execution in offline mode is performed by an application generator in the verification server 4. The application generator obtains a set of challenge-response pairs $(C_i,R_i)$ for embedding into the application during a personalisation step prior to downloading the application to the MS 1. Two variants of securing and personalising the application 12 in the verification server 4 will be described.

Figure 7:
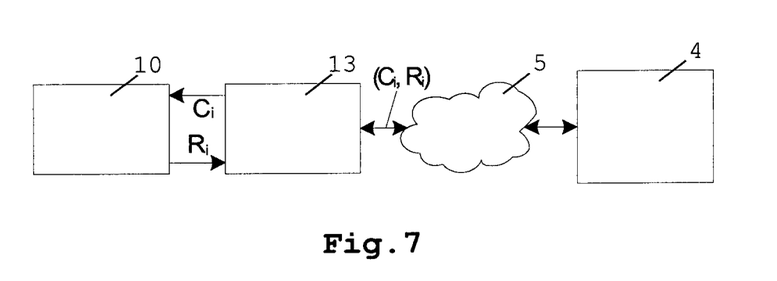
FIG. 7 is a schematic illustrations of a pre-install application, a SIM and a verification server according to and exemplary embodiment of the invention.

In a first variant of the first scenario, which is shown in FIG. 7, a set of challenge-response pairs is obtained in the verification server from the SIM 10 during a personalisation phase. The set of challenge-response pairs is obtained by executing a pre-install application 13 on the MS 1. The pre-install application 13 typically generates a number of challenges $C_i$ and obtains the responses $R_i$ from the SIM 10. Alternatively, the pre-install application 13 monitors and stores the challenges and responses that occur during regular GSM usage prior to the request from the application generator and communicates these challenges and responses to the application generator. The pre-install application 13 returns the set of challenge-response pairs $(C_i,R_i)$ to the application generator in the verification server 4, which uses the data to personalise the application for execution in offline mode. After the personalisation step, the verification server 4 installs the secured and personalized application in the MS 1.

The pre-install application can be a part of the personalised application, wherein the personalisation step provides a set of challenge-response pairs for use by the already installed software application. Alternatively the pre-install application can be a stand-alone application or a part of another application such as e.g. application installation software.

As a further personalisation step the application can optionally be configured to perform checks on the IMSI value in the SIM 10 and/or other information stored in the SIM 10 or in the MS 1, such as e.g. telephone numbers. The method disclosed in co-pending PCT patent application titled "Change-tolerant method of generating an identifier for a collection of assets in a computing environment using an error-correction code scheme" of applicant Irdeto Canada Corporation and having applicant's reference number 110587CA07, which is herewith incorporated by reference in its entirety, may be used to create challenge data from any information stored in the SIM 10.

Figure 8:
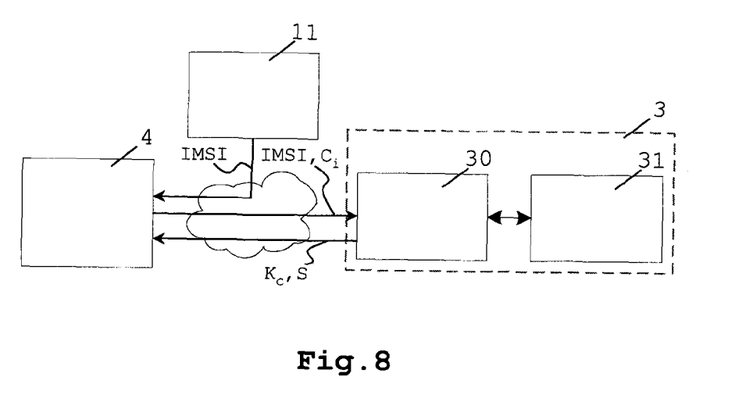
FIG. 8 is a schematic illustrations of a mobile equipment, a verification server and a home network according to and exemplary embodiment of the invention.

In a second variant of the first scenario, which is shown in FIG. 8, the challenge-response pairs are obtained in the verification server 4 from the AuC 31 associated with the SIM 10 during a personalisation phase. First the application generator in the verification server 4 obtains the subscriber identity as indicated by e.g. its IMSI value from the ME 11. The IMSI might be obtained from the OS or from another existing application in the MS 1. Alternatively, a dedicated pre-install application can be executed in the MS 1 to obtain the IMSI value from the SIM. After obtaining the IMSI value, the application generator uses standardised GSM protocols to request from the AuC 31 the generation of a signed response S and a ciphering key $K_c$ for a given random number R with the value $C_i$ and a given IMSI value. The home network 3 systems returns the response with $K_c$ and S which the verification server 4 combines in a function similar to function f 102 shown in FIG. 5 to form a response $R_i$ that corresponds to the challenge $C_i$. Repeating this process with different challenges provides the application generator with a set of challenge-response pairs $(C_i,R_i)$ which it uses to personalise the application. The personalised and secured application is installed in the MS 1. The benefit of this variant is that an attacker who has access to the MS 1 cannot observe the generation of the set of challenge-response pairs $(C_i,R_i)$.

In a second scenario the software application is enabled to be executed in a MS having a network connection, i.e. the MS is online.

Figure 9:
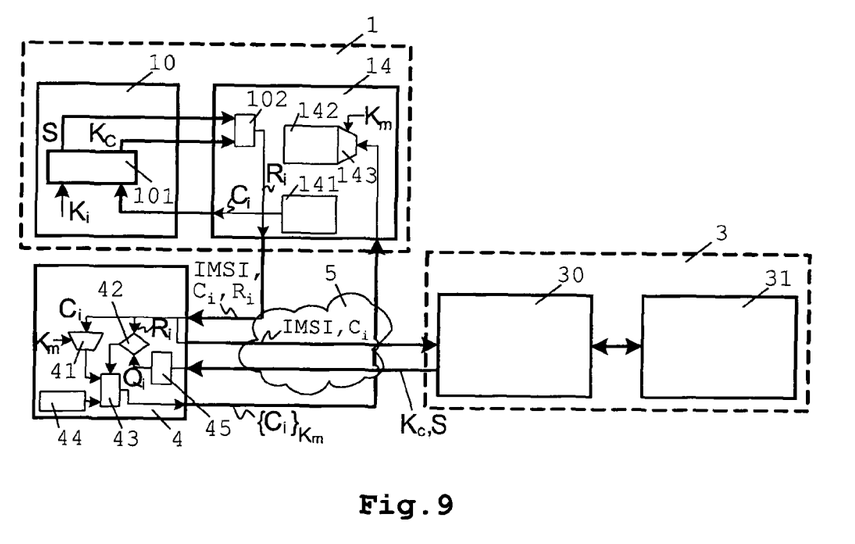
FIG. 9, FIG. 10 and FIG. 11 are schematic illustrations of a mobile station, a verification server and a home network according to exemplary embodiments of the invention.

In a first variant of the second scenario, which is shown in FIG. 9, during execution of an application 14 a first secured software part 141 of the application 14 sends challenge data $C_i$ in the form of runtime data to the SIM 10 with a request to calculate a response $K_c$,S. This means that the SIM 10 treats the runtime data $C_i$ as a random value R for input to the A8+A3 module 101. The application 14 uses the SIM interface to obtain the IMSI or any other identifier, $K_c$, and S values. Preferably a function f 102 is used to combine the values $K_c$ and S into a single value $R_i$, similar to the function f 102 shown in FIG. 5.

The values $C_i$, the IMSI or any other identifier, and $R_i$ are transmitted to the verification server 4. The verification server 4 processes the challenge data $C_i$ using a preferably unique function 41, such as a cryptographic function using a unique key $K_m$. The resulting processed challenge data is sent as response data $\{C_i\}_{K_m}$ to an inverse module 143 of the software application 14 to perform an inverse operation of the function 41 to undo its effects and enable a second secured software part 142 of the software application 14 to operate as intended.

Preferably, the key $K_m$ is linked to the IMSI value and the application. It may be stored securely in the verification server 4, but it can also be stored in encrypted form in the MS 1 in the form of a key loading message. The key loading message preferably takes the form as disclosed in applicant's co-pending European patent application titled "Key Transport Protocol" and having applicant's reference number 15464, which is herewith incorporated by reference in its entirety.

After receiving the parameters from the application 14, the verification server 4 can optionally verify the presence of the correct SIM card by requesting the home network 3 as identified by the IMSI value to process $C_i$ in an A8+A3 module of the AuC 31 and return the values for S and $K_c$. Hereto the verification server 4 sends the IMSI and $C_i$ values to the AuC 31 to obtain $K_c$,S. The $K_c$,S response from the AuC 31 may be converted into a authentic response $Q_i$ using a function $f(K_c,S)$ denoted by 45, which is typically identical to the function f 102. $R_i$ and $Q_i$ or the $K_c$,S values received from the software application 14 and the AuC 31 are compared by comparison function 42. If $Q_i$ and $R_i$ or the $K_c$,S values do not match, it is concluded that a verification error occurred, e.g. due to the presence of an incorrect SIM 10. In this case, instead of $\{C_i\}_{K_m}$ needed by the application 14 to be correctly executed, a random value generated by a random number generator 44 is transmitted from the verification server 4 to the MS 1. A selection module 43 may be used to output either $\{C_i\}_{K_m}$ or the random value in dependence of the result of the comparison function 42.

Figure 10:
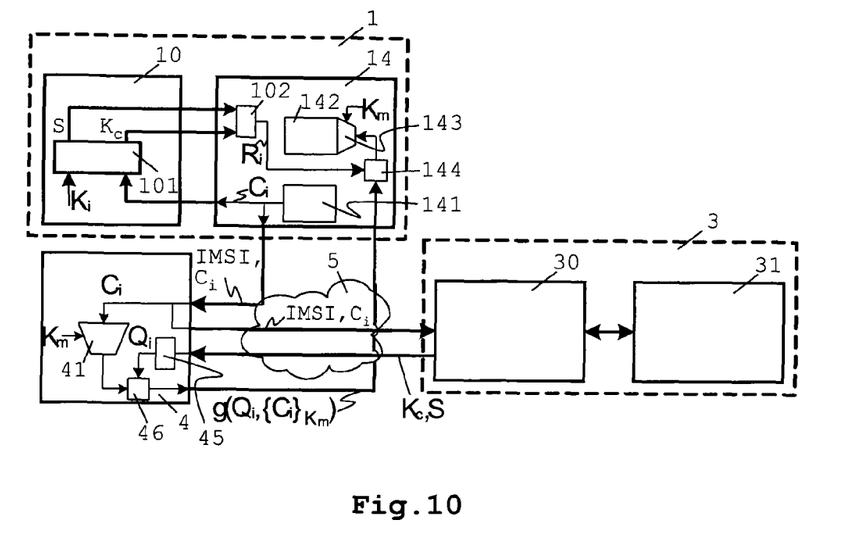

In a second variant of the second scenario, which is shown in FIG. 10, during execution of an application 14 a first secured software part 141 of the application 14 sends challenge data $C_i$ in the form of runtime data to the SIM 10 with a request to calculate a response $K_c$,S. This means that the SIM 10 treats the runtime data $C_i$ as a random value R for input to the A8+A3 module 101. The application 14 uses the SIM interface to obtain the IMSI or any other identifier, $K_c$, and S values. Preferably a function f 102 is used to combine the values $K_c$ and S into a single value $R_i$, similar to the function f 102 shown in FIG. 5.

The values $C_i$ and the IMSI (or any other identifier) are transmitted to the verification server 4. The verification server 4 processes the challenge data $C_i$ using a preferably unique function 41, such as a cryptographic function using a unique key $K_m$, to obtain an intermediate response data $\{C_i\}_{K_m}$.

Preferably, the key $K_m$ is linked to the IMSI value and the application, as described in the first variant of the second scenario.

The verification server 4 requests the home network 3 as identified by the IMSI value to process $C_i$ in an A8+A3 module of the AuC 31 and return the values for S and $K_c$. Hereto the verification server 4 sends the IMSI and $C_i$ values to the AuC 31 to obtain $K_c$,S. The $K_c$,S response from the AuC 31 may be converted into a authentic response $Q_i$ using a function $f(K_c,S)$ denoted by 45, which is identical to the function f 102.

The response data $\{C_i\}_{K_m}$ is combined with $Q_i$ using a function $g(Q_i,\{C_i\}_{K_m})=V_i$, which is denoted as 46, and sends the result to the MS 1. In the MS 1, the result of function g 46 is reversed using a function $h(R_i, V_i)=\{C_i\}_{K_m}$, which is denoted as 144 and uses as input $R_i$ received from function f 102 and $V_i$ received from the verification server 4. If the values for $Q_i$ and $R_i$ are equal, the result of the h( ) function will be the encrypted $C_i$, i.e. $\{C_i\}_{K_m}$.

Figure 11:
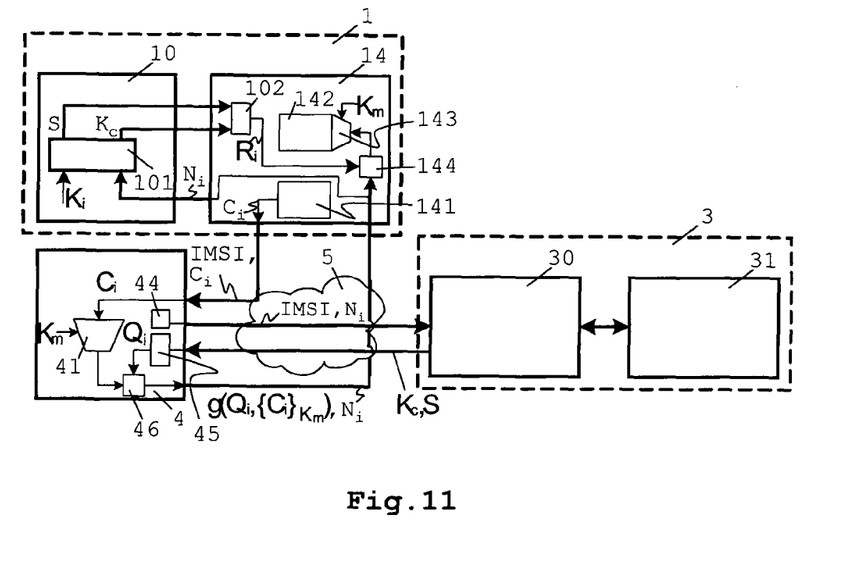

In a third variant of the second scenario, which is shown in FIG. 11, during execution of an application 14 a first secured software part 141 of the application 14 sends challenge data $C_i$ in the form of runtime data and the IMSI (or any other identifier) to the verification server 4. The verification server 4 processes the challenge data $C_i$ using a preferably unique function 41, such as a cryptographic function using a unique key $K_m$, to obtain an intermediate response data $\{C_i\}_{K_m}$.

For each IMSI value the verification server 4 has stored a secret key $K_m$ that corresponds to the same key value that is securely embedded in the secured and personalised application 14 in the MS 1. The securely embedded key $K_m$ makes the application 14 unique.

A random number generator 44 in the verification server 4 generates random data $N_i$. The verification server 4 requests the home network 3 as identified by the IMSI value to process the random data $N_i$ in an A8+A3 module of the AuC 31 and return the values for S and $K_c$. Hereto the verification server 4 sends the IMSI and $N_i$ values to the AuC 31 to obtain $K_c$,S. The $K_c$,S response from the AuC 31 may be converted into a authentic response $Q_i$ using a function $f(K_c,S)$ denoted by 45, which is identical to the function f 102.

The response data $\{C_i\}_{K_m}$ is combined with $Q_i$ using a function $g(Q_i,\{C_i\}_{K_m})=V_i$, which is denoted as 46, and sends the resulting $V_i$ together with the random data $N_i$ to the MS 1.

The application 14 sends the random data $N_i$ to the SIM 10 with a request to calculate a response $K_c$,S. This means that the SIM 10 treats the random data $N_i$ as a random value R for input to the A8+A3 module 101. The application 14 uses the SIM interface to obtain the IMSI or any other identifier, $K_c$, and S values. Preferably a function f 102 is used to combine the values $K_c$ and S into a single value $R_i$, similar to the function f 102 shown in FIG. 5.

In the MS 1, the result of function g 46 is reversed using a function $h(R_i,V_i)=\{C_i\}_{K_m}$, which is denoted as 144 and uses as input $R_i$ received from function f 102 and $V_i$ received from the verification server 4. If the values for $Q_i$ and $R_i$ are equal, the result of the h( ) function will be the encrypted $C_i$, i.e. $\{C_i\}_{K_m}$.

The functions g( ) 46 and h( ) 144 are related by the property $h(a,g(a,b))=b$. A simple example for g( ) and h( ) is an XOR function. The same relation for g( ) and h( ) exists in secret key encryption and decryption functions. In that case, $g(a,b)$ would represent the encryption of 'b' using the key 'a'. The resulting ciphertext 'c' can be decrypted using the key 'a' to obtain the cleartext 'b'. This is represented by the function call $h(a,c)$. The functions g( ) 46 and h( ) 144 are typically implemented as software modules.

The function h( ) 144 may be executed in the verification server 4 instead of the mobile station 1.

In the three variants of the second scenario, the software application 14, or a part of the software application 14, is implemented as a sequence of secured software modules, i.e. the first secured software module 141 and the second secured software module 142. Each secured software module 141, 142 exchanges parameters and/or state information in a transformed domain. By the procedure outlined above, the secured software application 14 is effectively anchored to the SIM 10.

The verification server 4 is configured with a preferably unique function 41 or preferably unique secret data that drives a common function that corresponds to an inverse function implemented in the inverse secured software module 143. The secret data is e.g. a personalized key $K_m$ linked to the IMSI value of the SIM 10. As the interfaces between the secured software modules are protected by transformations, the secured software application will not operate correctly if the output of first secured software module 141 is input directly into the inverse secured software module 143. In other words, bypassing the verification server interface is not possible as it results in a non-functional secured software application 14.

The inverse secured software module 143 and the second secured software module 142 can be implemented as a single module combining the functionalities of the two. The function 102 is typically a part of the software application 14, but may be implemented as a separate software module.

The inverse secured module 143, together with the key $K_m$, is preferably implemented as a secure software module that is integrated with secure software module 142.

The key $K_m$ is not necessarily unique per application 14, as the challenge can be generated at run time. If the challenge contains elements of a local execution state, the challenge will be unique to a particular execution instance of the application 14. Sharing the $K_m$ encrypted challenge, i.e. $\{C_i\}_{K_m}$, will be of little value as each application will have a different local execution state. This reduces the need to have a unique key $K_m$ in all applications.

The verification server 4 may use a key loading message, e.g. containing an encrypted version of the key $K_m$ receive from an external source, to load the key $K_m$ for use in the encryption function 41. One such mechanism could use the key loading mechanism as disclosed in applicant's co-pending European patent application titled "Key Transport Protocol" and having applicant's reference number 15464, which is herewith incorporated by reference in its entirety.

The verification server 4 uses the authorised response $Q_i$ to generate a return value. Only when the authorised response $Q_i$ equals the response $R_i$ generated by the SIM, the return value contains a result that can be used successfully in the later execution of the software application 14 in the MS 1. This effectively locks the application to the SIM 10.

In an alternative exemplary embodiment, which is not shown in FIG. 9 or FIG. 10, the order of the function 41 and the inverse secured software module 143 is reversed. In this embodiment the inverse secured software module performs the function 41 of the verification server 4 and the verification server performs the function of the inverse secured software module 143. In this embodiment the inverse secured software module and the first secured software module 141 can be implemented as a single module combining the functionalities of the two.

Responses from the authentication centre 31 may be cached in the verification server 4 for later use. It this manner is possible to receive multiple responses to multiple challenges from the authentication centre 31 and store the challenge and response pairs for later use.

A combination of the first and second scenario enables the verification server 4 to link the secured application 14 to the local SIM 10 for both online and offline situations. The online check of the first and second variant of the second scenario is more secure and can be used to add security to the offline checking of the first and second variant of the first scenario by replacing the used challenge-response pairs $(C_i,R_i)$ with newly generated ones.

It is to be understood that the invention is not limited to securing and personalizing software applications in a GSM MS, but that it can also be use in conjunction with other mobile telecommunication standards, such as in e.g. an UMTS/WCDMA MS, a LTE MS, a CDMA MS and a CDMA2000 MS.

One embodiment of the invention may be implemented as a program product for use with a computer system. The program(s) of the program product define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A method for enabling a software application to be executed on a mobile station, wherein the software application comprises a first secured software part, a second secured software part and an inverse module, wherein the mobile station comprises a mobile equipment and a subscriber identity module, the method comprising, during execution of the software application on the mobile equipment:

the software application inputting challenge data originating from the software application to the subscriber identity module, wherein the challenge data comprises at least a part of runtime data of the software application at the end of the first secured software part when being executed in the mobile equipment;

generating first response data in the subscriber identity module, wherein said generating comprises the subscriber identity module performing a first security function using (a) data which is associated with the subscriber identity module and (b) the challenge data;

enabling continued execution of the software application in dependence of the first response data;

transmitting the challenge data from the mobile station to a verification server;

generating second response data in the verification server in dependence of the challenge data;

enabling the continued execution of the software application in further dependence of the second response data;

inputting the challenge data to a cryptographic function of the verification server;

obtaining intermediate data from the cryptographic function using the challenge data and a first key as input to the cryptographic function;

transmitting the second response data from the verification server to the mobile station, wherein the second response data is based on the intermediate data;

inputting the second response data or a derivation of the second response data to an inverse cryptographic function in the inverse module to thereby obtain an inverted response data using a second key, wherein the inverted response data comprises the challenge data if the inverse function and the second key in the inverse module matches the cryptographic function and the first key in the verification server; and providing the inverted response data to the second secured software part to enable the continued execution of the software application.

2. The method according to claim 1, further comprising:

transmitting identity data from the mobile station to the verification server;

transmitting the identity data and the challenge data from the verification server to an authentication center;

generating third response data in the authentication center, wherein the authentication center is configured to perform a second security function corresponding to the identity data and wherein the third response data is generated using the second security function with the challenge data as input to the second security function;

receiving the third response data from the authentication center in the verification server; and obtaining the second response data from a first combine module in the verification server with the intermediate data and the third response data as input to the first combine module.

3. The method according to claim 2, further comprising:

transmitting the first response data from the mobile station to the verification server, and wherein the obtaining of the second response data comprises:

comparing the first response data with the third response data in the first combine module to obtain a comparison result; and modifying the second response data depending on the comparison result.

4. The method according to claim 2, wherein the software application further comprises a second combine module, and the method further comprises:
obtaining the derivation of the second response data using the second combine module with the first response data and the second response data as input to the second combine module.

5. The method according to claim 4, further comprising:
generating random data in the verification server;
transmitting the random data instead of the challenge data from the verification server to the authentication center for the generation of the third response data;
transmitting the random data from the verification server to the mobile station; and
inputting the random data instead of the challenge data to the subscriber identity module for the generation of the first response data.

6. The method according to claim 4, further comprising transmitting the first response data from the mobile station to the verification server, and wherein the second combine module is a part of the verification server.

7. The method according to claim 2, wherein the second security function comprises a second combined cipher key generation and authentication algorithm and wherein the third response data comprises at least one of a second cipher key and a second signed response.

8. The method according to claim 7, further comprising combining the second cipher key and the second signed response using a second combining function to obtain the third response data.

9. The method according to claim 1, wherein the order of the verification server and the inverse module is reversed, wherein the verification server is configured to perform the inverse function, and wherein the inverse module is configured to perform the cryptographic function.

* * * * *